United States Patent
Chae et al.

(10) Patent No.: US 9,628,996 B2
(45) Date of Patent: Apr. 18, 2017

(54) SPECTRUM SENSING APPARATUS AND METHOD FOR COOPERATIVE COGNITIVE RADIO NETWORK IN NON-GAUSSIAN NOISE ENVIRONMENT, AND FUSION CENTER APPARATUS AND COOPERATIVE COGNITIVE RADIO SYSTEM USING THE SAME

(71) Applicant: Research & Business Foundation Sungkyunkwan University, Suwon-si (KR)

(72) Inventors: Keun Hong Chae, Suwon-si (KR); Seok Ho Yoon, Suwon-si (KR)

(73) Assignee: RESEARCH & BUSINESS FOUNDATION SUNGKYUNKWAN UNIVERSITY, Suwon-si (KR)

( * ) Notice: Subject to any disclaimer, the term of this patent is extended or adjusted under 35 U.S.C. 154(b) by 0 days.

(21) Appl. No.: 14/518,181

(22) Filed: Oct. 20, 2014

(65) Prior Publication Data

US 2015/0109947 A1 Apr. 23, 2015

(30) Foreign Application Priority Data

Oct. 18, 2013 (KR) ........................ 10-2013-0124640

(51) Int. Cl.
*H04W 24/08* (2009.01)
*H04W 16/14* (2009.01)

(52) U.S. Cl.
CPC .................................. *H04W 16/14* (2013.01)

(58) Field of Classification Search
None
See application file for complete search history.

(56) References Cited

U.S. PATENT DOCUMENTS

2009/0221295 A1* 9/2009 Sahin et al. ................. 455/450
2010/0075704 A1* 3/2010 McHenry et al. ........... 455/509
(Continued)

FOREIGN PATENT DOCUMENTS

KR 10-2013-0008065 A 1/2013

OTHER PUBLICATIONS

Quan, Zhi, et al. "Optimal Multiband Joint Detection for Spectrum Sensing in Cognitive Radio Networks." Signal Processing, IEEE Transactions on 57.3 (2009): 1128-1140, Piscataway, NJ, USA.

(Continued)

*Primary Examiner* — Omar Ghowrwal
*Assistant Examiner* — Angel Brockman
(74) *Attorney, Agent, or Firm* — NSIP Law

(57) ABSTRACT

Disclosed herein are a spectrum sensing apparatus and method for a cognitive radio (CCR) network in a non-Gaussian noise environment and an FC apparatus and CCR system using the same. The cooperative cognitive radio (CCR) system includes M cognitive radios (CRs), and a fusion center (FC). Each of the M CRs samples a baseband signal obtained by down-converting a radio signal detected in the corresponding frequency spectrum, and generates spectrum sensing information (SSI) indicating that a PU signal has been detected based on the results of the sampling. The FC determines a joint threshold $\lambda_{FC}$ that can maximize an expected average throughput of a secondary user (SU) signal in a given communication environment including a maximum interference condition, calculates a joint test statistic from received M pieces of SSI, and determines whether the PU signal is present by comparing the calculated joint test statistic with the joint threshold.

17 Claims, 8 Drawing Sheets

(56) References Cited

U.S. PATENT DOCUMENTS

2012/0155444 A1* 6/2012 Chiueh et al. ............... 370/338
2012/0289236 A1* 11/2012 Xu et al. ...................... 455/446

OTHER PUBLICATIONS

Cho, Hyung-Weon, et al. "An Order Statistic-Based Spectrum Sensing Scheme for Cooperative Cognitive Radio Networks in Non-Gaussian Noise Environments." The Journal of Korean Institute of Communications and Information Sciences 37.11 (2012): 943-951, Seoul, Republic of Korea.

* cited by examiner

SPECTRUM SENSING APPARATUS AND METHOD FOR COOPERATIVE COGNITIVE RADIO NETWORK IN NON-GAUSSIAN NOISE ENVIRONMENT, AND FUSION CENTER APPARATUS AND COOPERATIVE COGNITIVE RADIO SYSTEM USING THE SAME

CROSS-REFERENCE TO RELATED APPLICATIONS

This application claims the benefit under 35 USC 119(a) of Korean Patent Application No. 10-2013-0124640 filed on Oct. 18, 2013 in Korean Intellectual Property Office, the entire disclosure of which is incorporated herein by reference for all purposes.

BACKGROUND

1. Technical Field

The present invention relates generally to a cooperative cognitive radio (CCR) network and, more particularly, to a spectrum sensing scheme for a CCR network.

2. Description of Related Art

With a rapid increase in demand for radio frequency bands, the value of radio frequency spectrum has increasingly grown. As a technology for increasing the efficiency of the use of radio frequency spectrum, dynamic spectrum assignment-based cognitive radio (CR) has attracted attention as a solution to the problem of lack of radio frequency spectrum.

In a CR system, a primary user (PU) has priority for a specific spectrum band. When the PU does not use the corresponding spectrum band, that is, a PU signal is not present, any secondary user (SU) can communicate in the corresponding spectrum band within a range in which the use of the spectrum of the SU does not interfere with the use of the spectrum of the PU. In order for the CR system to efficiently and flexibly operate, the support of a reliable spectrum sensing technology is essential.

Spectrum sensing technology is divided into coherent, non-coherent and signal feature detection schemes.

In most cases, since a CR does not have sufficient information about a transmission method, a pilot, a coherence message, etc. with respect to a PU signal in a spectrum band to be used, a non-coherent scheme-based spectrum sensing technology is commonly used. For example, energy detection is a non-coherent scheme-based spectrum sensing technology that requires a minimum amount of information about a transmission environment and that has a low level of complexity.

Meanwhile, although a PU has actually occupied a spectrum band, there may be cases where a specific CR uses the corresponding spectrum band because a PU signal is not detected due to fading or shadowing at a location or the time at which the CR is operating. In this case, the PU is subjected to communication interference.

To meet the need for technology for overcoming fading or shadowing, cooperative spectrum sensing (CSS) schemes in which a plurality of CRs achieves spatial diversity by sharing and joining together a plurality of pieces of spectrum sensing information (SSI) have appeared.

In these CSS schemes, each of the SUs transmits SSI indicative of the results of its individual determination of whether a PU signal is present in a spectrum band of interest to a fusion center (FC), and the FC joins a plurality of pieces of SSI together and finally determines whether a PU signal is present.

The above conventional CSS schemes are based on the assumption that noise follows a Gaussian distribution. However, in the practical communication environment, non-Gaussian impulsive noise often occurs due to a moving large object, a power line opening/closing transient phenomenon, the startup of a vehicle, waves reflected from the surface of the sea, lightning, solar winds, or the like. In this case, noise is modeled by an impulsive noise model. Furthermore, SUs may be operating in respective different noise environments.

The conventional Gaussian noise distribution-based CSS schemes are problematic in that they exhibit poor performance in such actual noise environments.

SUMMARY

Some embodiments of the present invention are directed to the provision of a spectrum sensing apparatus and method for a CCR network in a non-Gaussian noise environment, and an FC apparatus and CCR system using the spectrum sensing apparatus and method.

Some embodiments of the present invention are directed to the provision of a spectrum sensing apparatus and method for a CCR network that are capable of reducing the influence of impulsive noise in a non-Gaussian noise environment.

Some embodiments of the present invention are directed to the provision of an FC apparatus and a CCR system that is capable of, in order to reduce the influence of impulsive noise in a non-Gaussian noise environment, obtaining best results under various scenarios that are encountered by a PU and CRs when the results of the CRs are combined together.

In accordance with an aspect of the present invention, there is provided a cooperative cognitive radio (CCR) system, including M cognitive radios (CRs) each configured to, in order to determine whether a primary user (PU) is currently occupying a frequency spectrum band assigned to the PU, sample a baseband signal obtained by down-converting a radio signal detected in the corresponding frequency spectrum, and generate spectrum sensing information (SSI) indicating that a PU signal has been detected based on the results of the sampling; and a fusion center (FC) configured to determine a joint threshold $\lambda_{FC}$ that can maximize an expected average throughput of a secondary user (SU) signal in a given communication environment including a maximum interference condition, to calculate a joint test statistic from M pieces of SSI received from the respective M CRs when receiving the M pieces of SSI from the respective M CRs, and to determine whether the PU signal is present by comparing the calculated joint test statistic with the joint threshold $\lambda_{FC}$.

In an embodiment, the FC may include a PU signal determination unit configured to receive M pieces of SSI from the respective M CRs, and to determine whether the PU signal is present based on a determined joint test statistic $\lambda_{FC}$; and a threshold optimization unit configured to determine the joint threshold $\lambda_{FC}$ that can maximize an expected average throughput of the SU signal based on a given communication environment including a maximum interference condition.

In an embodiment, the threshold optimization unit may be further configured to determine the joint threshold $\lambda_{FC}$ to be a value that can maximize the expected average throughput of the SU signal based on a given maximum interference condition, the number of CRs, a false alarm probability, a detection probability, the designed throughput of the SU signal, and the magnitude of interference imposed on a PU signal by the SU signal.

In an embodiment, the threshold optimization unit may be further configured to determine the joint threshold $\lambda_{FC}$ to be a value that satisfies the following equation:

$$\max \sum_{x=0}^{\lambda_{FC}-1} (1-p_{fa})^{M-x}(p_{fa})^x {}_M C_{M-x} \times R$$

$$\text{such that } \sum_{x=0}^{\lambda_{FC}-1} (1-p_d)^{M-x}(p_d)^x {}_M C_{M-x} \times C \leq \epsilon$$

$$0 \leq \lambda_{FC} \leq M$$

where $p_{fa}$ is a false alarm probability of any one CR, $p_d$ is a detection probability of the CR, R is the designed throughput of the SU signal, x is the number of CRs that belong to the M CRs and also detect the PU signal, ${}_M C_{M-x}$ is a combination indicative of the number of cases where M-x CRs are selected from among the M CRs, C is the magnitude of interference that the SU signal imposes upon the PU signal, and $\epsilon$ is a given maximum interference magnitude condition.

In an embodiment, the threshold optimization unit may be further configured to determine the joint threshold $\lambda_{FC}$ to be 1 and a corresponding counting rule to be an OR rule, or to determine the joint threshold $\lambda_{FC}$ to be M and a corresponding counting rules to be an AND rule, based on the given maximum interference condition.

In an embodiment, the FC may further include a dynamic band management unit configured to continuously manage information about a band in which a PU signal is present and an empty band throughout overall spectrum, and to perform control depending on a band use request from an SU and the determination of whether the PU signal is present so that the empty band is assigned to the SU or a band that is being used by the SU is withdrawn or changed.

In an embodiment:

the CR may include a spectrum sensing unit configured to generate the SSI indicating that the PU signal has been detected based on the results of the sampling; and the spectrum sensing unit may include a sampling unit configured to sample the received baseband signal, and to generate an observation vector $\underline{y_m}=\{y_m(1), y_m(2), \ldots, y_m(N)\}$ (m is an integer that satisfies $1 \leq m \leq M$) composed of N sampled observations; an observation selection unit configured to select $J_m$ ($J_m$ is an integer that satisfies $1 \leq J_m \leq N$) observations from an order statistic $\{\underline{y_{m(1)}}, \underline{y_{m(2)}}, \ldots, \underline{y_{m(N)}}\}$, obtained by rearranging the observation vector $\underline{y_m}$ in ascending order of size, in ascending order of size; a test unit configured to calculate a test statistic $T_{GSO}(\underline{y_m},J_m)$ according to a generalized likelihood ratio test (GLRT) based on the $J_m$ selected observations (GSO) in a given noise environment; and an SSI generation unit configured to determine whether the received baseband signal is a PU signal by comparing the calculated test statistic $T_{GSO}(\underline{y_m},J_m)$ with a given local threshold $\lambda_m$ and then generate the SSI.

In an embodiment, the test unit, when a non-Gaussian impulsive noise environment is modeled to follow a bivariate isotropic symmetric α-stable (BISαS) distribution, may calculate a test statistic $T_{GSO}(\underline{y_m},J_m)=G_C(\underline{y_m},J_m)$ by squaring the absolute value of the l-th (l is an integer that satisfies $1 \leq l \leq k$) selected observation $\underline{y_{m(l)}}$ of the m-th (m is an integer that satisfies $1 \leq m \leq M$) CR, dividing the squared value by $\lambda_m^2$, adding 1 to the result of the division, obtaining the natural logarithm of the result of the addition, and summing natural logarithms, in accordance with the following equation:

$$G_C(\underline{y_m}, k) = \sum_{l=1}^{k} \ln\left\{1 + \frac{|y_{m(l)}|^2}{\gamma_m^2}\right\}$$

where $k=J_m$, and $\gamma_m$ is the dispersion of the probability density function (PDF) of the BISαS distribution of the m-th CR.

In an embodiment, the test unit, when a non-Gaussian impulsive noise environment is modeled to follow a BIS α S distribution, may calculate a test statistic $T_{GSO}(\underline{y_m},J_m)=G_G(\underline{y_m},J_m)$ by squaring the absolute value of the l-th (l is an integer that satisfies $1 \leq l \leq k$) selected observation $\underline{y_{m(l)}}$ of an m-th (m is an integer that satisfies $1 \leq m \leq M$) CR, dividing the squared value by $2\sigma_m^2$, and summing results of the division, in accordance with the following equation:

$$G_G(\underline{y_m}, k) = \frac{1}{2\sigma_m^2} \sum_{l=1}^{k} |y_{m(l)}|^2$$

where $k=J_m$, and $2\sigma_m^2$ is the dispersion of the PDF of the BISαS distribution of the m-th CR.

In an embodiment, the SSI generation unit may be further configured to receive the test statistic $T_{GSO}(\underline{y_m},J_m)$ based on the $J_m$ selected observations of the observation vector $\underline{y_m}$ from the test unit, and to generate the SSI using a binary SSI value $x_m$ in accordance with the following equation:

$$x_m = \begin{cases} 1, & \text{if } T_{GSO}(\underline{y_m}, J_m) \geq \lambda_m \\ 0, & \text{otherwise} \end{cases}$$

where the threshold $\lambda_m$ is an individual threshold given to the m-th CR.

In accordance with another aspect of the present invention, there is provided an FC for a CCR network, including a PU signal determination unit configured to receive M pieces of SSI from M CRs constituting the CCR network, to calculate a joint test statistic from the received M pieces of SSI, and to determine whether a PU signal is present by comparing the calculated joint test statistic with a joint threshold $\lambda_{FC}$; and a threshold optimization unit configured to determine the joint threshold $\lambda_{FC}$ that an expected average throughput of an SU signal can be maximized based on a given communication environment including a maximum interference condition.

In an embodiment, the threshold optimization unit may be further configured to determine the joint threshold $\lambda_{FC}$ to be a value that can maximize the expected average throughput of the SU signal based on a given maximum interference condition, the number of CRs, a false alarm probability, a detection probability, the designed throughput of the SU signal, and the magnitude of interference imposed on a PU signal by the SU signal.

In an embodiment, the threshold optimization unit may be further configured to determine the joint threshold $\lambda_{FC}$ to be a value that satisfies the following equation:

$$\max \sum_{x=0}^{\lambda_{FC}-1} (1-p_{fa})^{M-x}(p_{fa})^x {}_M C_{M-x} \times R$$

$$\text{such that } \sum_{x=0}^{\lambda_{FC}-1} (1-p_d)^{M-x}(p_d)^2 {}_M C_{M-x} \times C \leq \epsilon$$

$$0 \leq \lambda_{FC} \leq M$$

where $p_{fa}$ is a false alarm probability of any one CR, $p_d$ is a detection probability of the CR, R is the designed throughput of the SU signal, x is the number of CRs that belong to the M CRs and also detect the PU signal, ${}_M C_{M-x}$ is a combination indicative of the number of cases where M−x CRs are selected from among the M CRs, C is the magnitude of interference that the SU signal imposes upon the PU signal, and $\epsilon$ is a given maximum interference magnitude condition.

In an embodiment, the threshold optimization unit may be further configured to determine the joint threshold $\lambda_{FC}$ to be 1 and a corresponding counting rule to be an OR rule, or to determine the joint threshold $\lambda_{FC}$ to be M and a corresponding counting rules to be an AND rule, based on the given maximum interference condition.

In an embodiment, the FC may further include a dynamic band management unit configured to continuously manage information about a band in which a PU signal is present and an empty band throughout overall spectrum, and to perform control depending on a band use request from an SU and a determination of whether the PU signal is present so that the empty band is assigned to the SU or a band that is being used by the SU is withdrawn or changed.

In accordance with still another aspect of the present invention, there is provided a spectrum sensing method for a CCR system including M CRs and an FC, the method including sampling, by each of the M CRs, a received baseband signal; selecting, by each of the M CRs, $J_m$ ($J_m$ is an integer that satisfies $1 \leq J_m \leq N$) selected observations from an order statistic $\{y_{m(1)}, y_{m(2)}, \ldots, y_{m(N)}\}$, obtained by rearranging the observation vector $y_m$ (m is an integer that satisfies $1 \leq m \leq M$) composed of N sampled observations in ascending order of size, in ascending order of size; calculating, by each of the M CRs, a test statistic $T_{GSO}(y_m, J_m)$ according to a GLRT based on the $J_m$ selected observations (GSO) in a given noise environment; determining, by each of the M CRs, whether the received baseband signal is a PU signal by comparing the calculated test statistic $T_{GSO}(y_m, J_m)$ with a given local threshold $\lambda_m$, generating, by each of the M CRs, SSI based on a result of the determination, and transmitting, by each of the M CRs, the SSI to an FC; determining, by the FC, a joint threshold $\lambda_{FC}$ that can maximize an expected average throughput of an SU signal based on a given communication environment including a maximum interference condition; and calculating, by the FC, a joint test statistic from M pieces of SSI received from M CRs, and determining, by the FC, whether a PU signal is present by comparing the calculated joint test statistic with the joint threshold $\lambda_{FC}$.

In an embodiment, determining, by the FC, the joint threshold $\lambda_{FC}$ the threshold optimization unit may include determining the joint threshold $\lambda_{FC}$ be a value that can maximize the expected average throughput of the SU signal based on a given maximum interference condition, the number of CRs, a false alarm probability, a detection probability, the designed throughput of the SU signal, and the magnitude of interference imposed on a PU signal by the SU signal.

In an embodiment, determining, by the FC, the joint threshold $\lambda_{FC}$ the threshold optimization unit may include determining the joint threshold $\lambda_{FC}$ to be a value that satisfies the following equation:

$$\max \sum_{x=0}^{\lambda_{FC}-1} (1-p_{fa})^{M-x}(p_{fa})^x \quad {}_M C_{M-x} \times R$$

$$\text{such that } \sum_{x=0}^{\lambda_{FC}-1} (1-p_d)^{M-x}(p_d)^2 \quad {}_M C_{M-x} \times C \leq \epsilon$$

$$0 \leq \lambda_{FC} \leq M$$

where $p_{fa}$ is a false alarm probability of any one CR, $p_d$ is a detection probability of the CR, R is the designed throughput of the SU signal, x is the number of CRs that belong to the M CRs and also detect the PU signal, ${}_M C_{M-x}$ is a combination indicative of the number of cases where M-x CRs are selected from among the M CRs, C is the magnitude of interference that the SU signal imposes upon the PU signal, and $\epsilon$ is a given maximum interference magnitude condition.

In an embodiment, determining, by the FC, the joint threshold $\lambda_{FC}$ the threshold optimization unit may include determining the joint threshold $\lambda_{FC}$ to be 1 and a corresponding counting rule to be an OR rule, or determining the joint threshold $\lambda_{FC}$ to be M and a corresponding counting rules to be an AND rule, based on the given maximum interference condition.

In an embodiment, calculating the test static $T_{GSO}(y_m, J_m)$ may include calculating, when a non-Gaussian impulsive noise environment is modeled to follow a bivariate isotropic symmetric $\alpha$-stable (BIS $\alpha$ S) distribution, a test statistic $T_{GSO}(y_m, J_m) = G_C(y_m, J_m)$ by squaring an absolute value of an l-th (l is an integer that satisfies $1 \leq l \leq k$) selected observation $y_{m(l)}$ of an m-th (m is an integer that satisfies $1 \leq m \leq M$) CR, dividing the squared value by $\gamma_m^2$, adding 1 to the result of the division, obtaining a natural logarithm of a result of the addition, and summing natural logarithms, in accordance with the following equation:

$$G_C(y_m, k) = \sum_{l=1}^{k} \ln\left\{1 + \frac{|y_{m(l)}|^2}{\gamma_m^2}\right\}$$

where $k = J_m$, and $\gamma_m$ is a dispersion of a probability density function (PDF) of a BIS$\alpha$S distribution of the m-th CR.

In an embodiment, calculating the test static $T_{GSO}(y_m, J_m)$ may include calculating, when a non-Gaussian impulsive noise environment is modeled to follow a BIS$\alpha$S distribution, a test statistic $T_{GSO}(y_m, J_m) = G_G(y_m, J_m)$ by squaring an absolute value of an l-th (l is an integer that satisfies $1 \leq m \leq k$) selected observation $y_{m(l)}$ of an m-th (m is an integer that satisfies $1 \leq m \leq M$) CR, dividing the squared value by $2\sigma_m^2$, and summing results of the division, in accordance with the following equation:

$$G_G(y_m, k) = \frac{1}{2\sigma_m^2} \sum_{l=1}^{k} |y_{m(l)}|^2$$

where $k = J_m$, and $2\sigma_m^2$ is a dispersion of a PDF of a BIS$\alpha$S distribution of the m-th CR.

In an embodiment, generating the SSI may include generating, with respect to the test statistic $T_{GSO}(\underline{y_m}, J_m)$, the SSI using a binary SSI value $x_m$ in accordance with the following equation:

$$x_m = \begin{cases} 1, & \text{if } T_{GSO}(\underline{y_m}, J_m) \geq \lambda_m \\ 0, & \text{otherwise} \end{cases}$$

where the threshold $\lambda_m$ is an individual threshold given to the m-th CR.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

Figure 1:
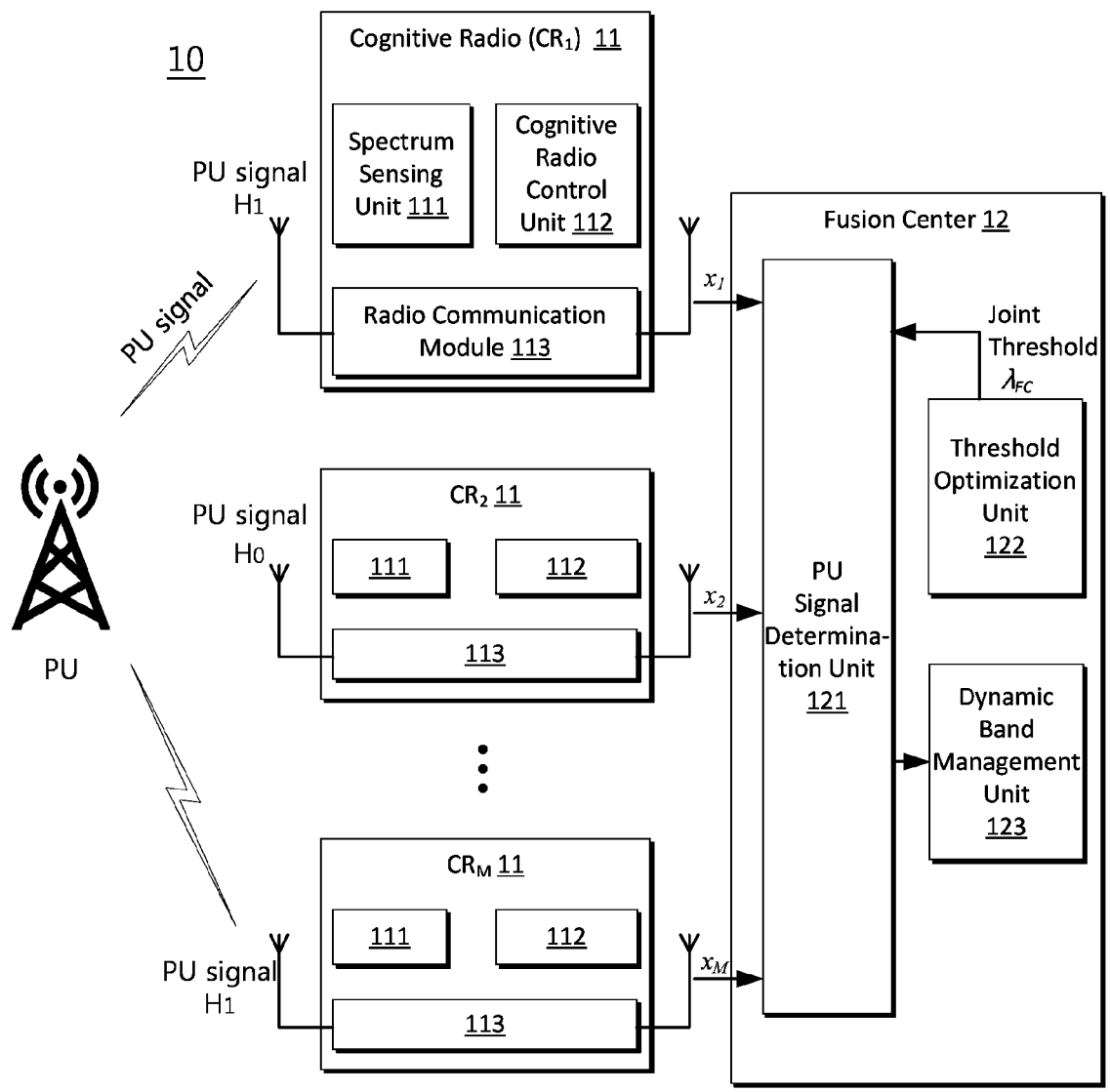
FIG. 1 is a schematic conceptual diagram of a CCR system in which CRs and an FC for a CCR network operate cooperatively in a non-Gaussian noise environment according to an embodiment of the present invention.

Specific structural and functional descriptions of embodiments of the present invention disclosed herein are given merely for the purpose of illustrating example embodiments of the present invention. Embodiments of the present invention may be practiced in various forms, and should not be construed as being limited to embodiments described herein.

Preferred embodiments of the present invention are described in detail below with reference to the accompanying diagrams. The same reference numerals are assigned to the same components throughout the drawings, and redundant descriptions of the same components are omitted.

FIG. 1 is a schematic conceptual diagram of a CCR system in which CRs and an FC for a CCR network operate cooperatively in a non-Gaussian noise environment according to an embodiment of the present invention.

A CCR system 10 includes CRs 11 and an FC 12.

Each of the CRs 11 may include a spectrum sensing unit 111, a CR control unit 112, and a radio communication module 113.

In order to determine whether a PU is currently occupying a frequency spectrum band assigned to the PU, the spectrum sensing unit 111 samples a baseband signal obtained by down-converting a radio signal detected in the corresponding frequency spectrum, and generates SSI indicating that a PU signal has been detected based on the results of the sampling.

The detailed operation of the spectrum sensing unit 111 will be described with reference to the spectrum sensing unit of the CR of FIG. 2 later.

The CR control unit 112 may output the SSI generated by the spectrum sensing unit 111 to the FC 12 via the radio communication module 113, and may operate the radio communication module 113 in accordance with a radio resource configuration indicated by a radio control signal received from the FC 12.

In an embodiment, if a single CR user, that is, a single CR 11, constitutes a single CR network in a CCR system, the CR control unit 112 may operate the radio communication module 113 in a band in which a PU signal is determined to have been detected based on the SSI.

Meanwhile, the FC 12 may include a PU signal determination unit 121, a threshold optimization unit 122, and a dynamic band management unit 123.

The PU signal determination unit 121 receives M pieces of SSI from M CRs 10, calculates a joint test statistic $T_{FC}(\underline{x})$ from the received M pieces of SSI, and determines whether a PU signal is present by comparing the calculated joint test statistic $T_{FC}(\underline{x})$ with a joint threshold $\lambda_{FC}$ given in accordance with predetermined counting rules or determined appropriately.

The threshold optimization unit 122 determines a joint threshold $\lambda_{FC}$ that can maximize the expected average throughput of an SU signal in a given communication environment including a maximum interference condition.

More specifically, the threshold optimization unit 122 determines the joint threshold $\lambda_{FC}$ that can maximize the expected average throughput of the SU signal based on a given maximum interference condition, the number of CRs, a false alarm probability, a detection probability, the designed throughput of the SU signal, and the magnitude of interference imposed on a PU signal by the SU signal.

The dynamic band management unit 123 may continuously manage information about a band in which a PU signal is present and an empty band throughout overall spectrum, and may perform control depending on a band use request from an SU and the determination of whether the PU signal is present so that the empty band is assigned to the SU or a band that is being used by the SU is withdrawn or changed.

Figure 2:
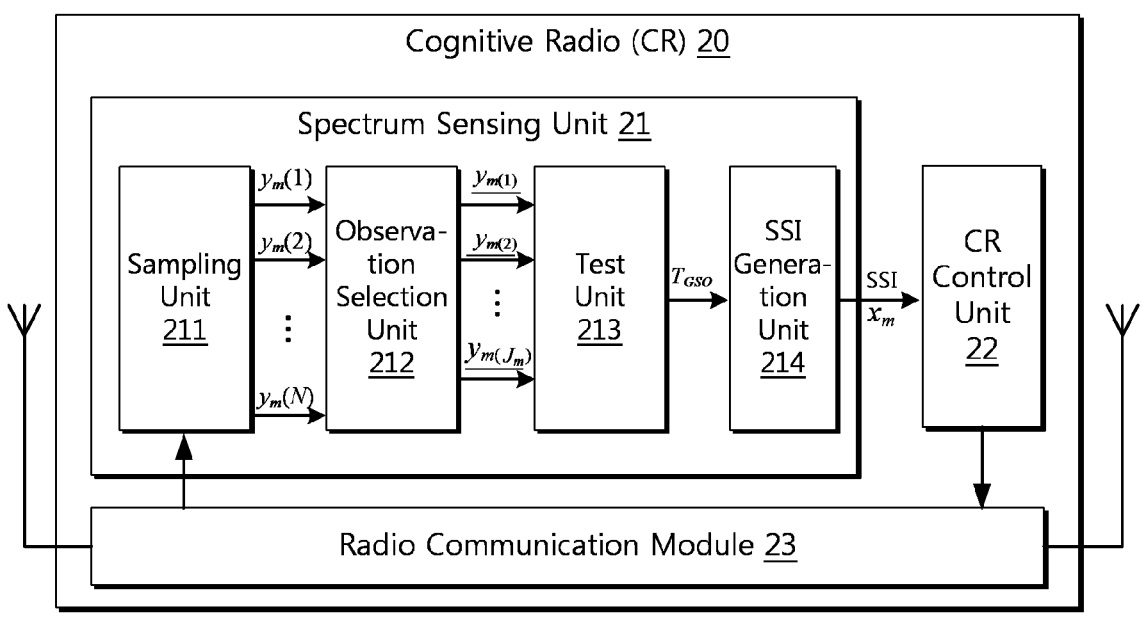
FIG. 2 is a block diagram of a CR for a CCR network in a non-Gaussian noise environment according to an embodiment of the present invention.

In order to describe the spectrum sensing operation of the CRs 11, reference is made to FIG. 2. FIG. 2 is a block diagram of a CR for a CCR network in a non-Gaussian noise environment according to an embodiment of the present invention.

First, a CR network including a single FC 12 and M CR users 11 is considered. The n-th baseband sample $y_m(n)=y_{m,I}(n)+jy_{m,Q}(n)$ of an m-th ($1 \leq m \leq M$) CR user may be expressed by the following Equation 1:

$$y_m(n) = \omega_m(n), n=1,2,\ldots,N \qquad (1)$$

In this case, I and Q are the in-phase and quadrature components of a sample $y_m(n)$, respectively, and N is the total number of observation samples. $w_m(n)$ is complex additive noise that is expressed as $w_m(n)=w_{m,I}(n)+jw_{m,Q}(n)$ like $y_m(n)$, and is independent of m and n.

If there is a PU signal, the baseband sample $y_m(n)$ is given by the following Equation 2:

$$y_m(n) = h_m s(n) + \omega_m(n), \quad n=1,2,\ldots,N \quad (2)$$

In this case, s(n) is given as $s(n)=s_I(n)+js_Q(n)$ and represents the n-th sample of a complex signal transmitted from a PU, and $h_m$ is given as $h_m=h_{m,I}(n)+jh_{m,Q}(n)$ and represents complex channel coefficients. It is assumed that M complex channel coefficients $h_m$ all have the same distribution, are independent of each other, and have values that do not vary throughout a spectrum sensing interval.

Non-Gaussian impulsive noise may be modeled to follow a bivariate isotropic symmetric α-stable (BISαS) distribution.

The probability density function (PDF) of the BISαS distribution may be expressed by the following Equation 3:

$$f_{BI}(u_1, u_2) = \frac{1}{(2\pi)^2} \int_{-\infty}^{\infty} \int_{-\infty}^{\infty} e^{\left\{-j(u_1 t_1 + u_2 t_2) - \gamma(t_1^2 + t_2^2)^{\frac{\alpha}{2}}\right\}} dt_1 \, dt_2 \quad (3)$$

In this case, with respect to the probability variables $u_1$ and $u_2$, α is a characteristic exponent, and satisfies $0<\alpha\leq 2$. When the α value is small, the thickness of the periphery of a PDF becomes larger. This can represent an environment in which the probability of impulsive noise occurring has increased. Using the above characteristic of the α value, the extent of the influence of an impulsive noise component may be represented. γ is dispersion, and may represent a tendency in which the PDF spreads wider as γ increases.

The PDF of the BISαS distribution, such as that of Equation 3, is arranged in a closed form only when α=1 and α=2. A case where α=1 is referred to as a "bivariate Cauchy distribution," and may be arranged as the following Equation 4:

$$f_{BC}(u_1, u_2) = \frac{\gamma}{2\pi(u_1^2 + u_2^2 + \gamma^2)^{3/2}} \quad (4)$$

A case where α=2 is referred to as a "bivariate Gaussian distribution," and may is arranged as the following Equation 5:

$$f_{BC}(u_1, u_2) = \frac{1}{2\pi\sigma^2} \exp\left(-\frac{u_1^2 + u_2^2}{2\sigma^2}\right) \quad (5)$$

In this case, $\sigma^2=2\gamma$ is a variance.

On the assumption that this noise distribution is given, if the CR knows the characteristic information of the PU signal, such as a modulation method, a pulse type, a packet format, etc., in a known noise distribution environment, the CR can achieve optimum performance using a matching filter.

However, since it is actually difficult for the CR to know the various types of information of the PU signal, it is generally determined whether a signal caught by an m-th CR is a PU signal using a generalized likelihood ratio test (GLRT) based on the maximum likelihood estimate (MLE) of the significant signal component $h_m s(n)$ of a radio signal $y_m(n)$ sampled at the m-th CR, in place of a matching filter.

For this purpose, the CR 20 of FIG. 2 includes a spectrum sensing unit 21, a CR control unit 22, and a radio communication module 23. The CR 20 is the m-th CR of M CRs that constitute a single CCR system.

The radio communication module 23 extracts a received radio signal from a baseband signal in a frequency spectrum, that is, an object of interest, under the control of the CR control unit 22, and then transfers the extracted baseband signal to the spectrum sensing unit 21.

The spectrum sensing unit 21 samples the received baseband signal, determines whether the received baseband signal is a PU signal based on a test statistic, obtained via a GLRT based on selected observations (herein referred to as a "GSO") selected from the order statistic of sampled observations in order of size, and a given local threshold, and then generates SSI.

For this purpose, the spectrum sensing unit 21 includes a sampling unit 211, an observation selection unit 212, a test unit 213, and an SSI generation unit 214.

The sampling unit 211 samples the received baseband signal, and then transfers an observation vector $\underline{y}_m$ composed of N sampled observations to the observation selection unit 212.

The observation selection unit 212 selects $J_m$ observations from an order statistic $\{\underline{y}_{m(1)}, \underline{y}_{m(2)}, \ldots, \underline{y}_{m(N)}\}$, obtained by rearranging the observation vector $\underline{y}_m$ in ascending order of size, in ascending order of size, and then transfers the $J_m$ selected observations to the test unit 213.

The test unit 213 calculates a test statistic according to a GLRT based on the $J_m$ selected observations (GSO) in a given noise environment.

The SSI generation unit 214 determines whether the received baseband signal is a PU signal by comparing the calculated test statistic with a given local threshold, and then generates SSI.

More theoretically, the problem of whether a spectrum has been sensed may be ultimately regarded as the problem of which of a hypothesis in which a spectrum is empty and a hypothesis in which a spectrum is being occupied is correct, that is, a binary hypothesis verification problem.

If hypothesis $H_0$ is a hypothesis in which a PU spectrum is empty, its alternative hypothesis $H_1$ may be a hypothesis in which a PU spectrum is being occupied.

In specific hypothesis $H_0$ or $H_1$, when the joint PDF of an observation vector $\underline{y}_m$ is $f_{H0}$ or $f_{H1}$, a GLRT test statistic $T_{GL}(\underline{y}_m)$ at an m-th CR may be expressed by the following Equation 6:

$$T_{GL}(\underline{y}_m) = \ln\left\{\frac{f_{H_1}(\underline{y}_m)}{f_{H_0}(\underline{y}_m)}\right\} = \sum_{n=1}^{N} \ln\left\{\frac{f_m(y_m(n) - h_m s(n))}{f_m(y_m(n))}\right\} \quad (6)$$

where ln(•) is a natural logarithm term, $\hat{\bullet}$ is an MLE term, and $f_m$ represents the joint PDF of $w_{m,I}(n)$ and $w_{m,Q}(n)$ for n that satisfies $1\leq n \leq N$.

Meanwhile, when, at the m-th CR, the dispersion is $\gamma=\gamma_m$ and the variance is $\sigma=\sigma_m^2$, the numerator component of the natural logarithm term in Equation 6 may be derived for Cauchy and Gaussian noise environments, and may be arranged as the following Equations 7 and 8:

$$f_m(y_m(n) - h_m s(n)) = \frac{\gamma_m}{2\pi\{|y_m(n) - h_m s(n)|^2 + \gamma_m^2\}^{\frac{3}{2}}} \quad (7)$$

-continued $$f_m(y_m(n) - h_m s(n)) = \frac{1}{2\pi\sigma_m^2} \exp\left\{-\frac{1}{2\sigma_m^2}|y_m(n) - h_m s(n)|^2\right\} \quad (8)$$

From Equations 7 and 8, the MLE $h_m s(n)$ of the signal component $h_m s(n)$ in the Cauchy and Gaussian noise environments may be obtained as the following Equation 9:

$$h_m s(n) = y_m(n) \quad (9)$$

If the MLE $h_m s(n)$ of the signal component $h_m s(n)$ is $y_m(n)$ as given in Equation 9, the present invention proposes a GSO-based test statistic $T_{GSO}(\underline{y_m}, J_m)$, calculated by the test unit 213 with respect to $J_m$ observations selected from the observation vector $\underline{y_m}$ in ascending order of size, as shown in the following Equation 10:

$$T_{GSO}(\underline{y_m}, J_m) = \sum_{l=1}^{J_m} \ln\left\{\frac{f_{m(l)}(y_{m(l)} - h_m s_{(l)})}{f_m(y_{m(l)})}\right\} \quad (10)$$

where l satisfies $1 \leq l \leq J_m$ and is the index of a selected observation, $J_m$ is the number of selected observations for the m-th CR, and $\underline{h_m s_{(l)}} = h_m s(\bar{n})$ for an integer $\bar{n}$ that satisfies $y_m(\bar{n}) = y_{m(l)}$.

In accordance with Equations 6 to 10, a test statistic $G_C(\underline{y_m}, k)$ in the Cauchy noise environment may be defined as the following Equation 11:

$$G_C(\underline{y_m}, k) = \sum_{l=1}^{k} \ln\left\{1 + \frac{|y_{m(l)}|^2}{\gamma_m^2}\right\} \quad (11)$$

In this equation, $k \in \{1, 2, \ldots, J_m, \ldots, N\}$. In accordance with Equation 11, in the Cauchy noise environment, a GSO test statistic $T_{GSO}(\underline{y_m}, j_m)$ based on the $J_m$ observations of the observation vector $\underline{y_m}$ may be obtained as $G_C(\underline{y_m}, k)$, that is, $T_{GSO}(\underline{y_m}, J_m) = G_C(\underline{y_m}, J_m)$ when $k = J_m$.

In the same manner, the test statistic $G_G(\underline{y_m}, k)$ in the Gaussian noise environment may be defined as the following Equation 12:

$$G_G(\underline{y_m}, k) = \frac{1}{2\sigma_m^2} \sum_{l=1}^{k} |y_{m(l)}|^2 \quad (12)$$

In this equation, $k \in \{1, 2, \ldots, J_m, \ldots, N\}$. In accordance with Equation 12, in the Gaussian noise environment, a GSO test statistic $T_{GSO}(\underline{y_m}, j_m)$ based on the $J_m$ observations of the observation vector $\underline{y_m}$ may be obtained as $G_G(\underline{y_m}, k)$, that is, $T_{GSO}(\underline{y_m}, J_m) = G_G(\underline{y_m}, J_m)$ when $k = J_m$.

Figure 3:
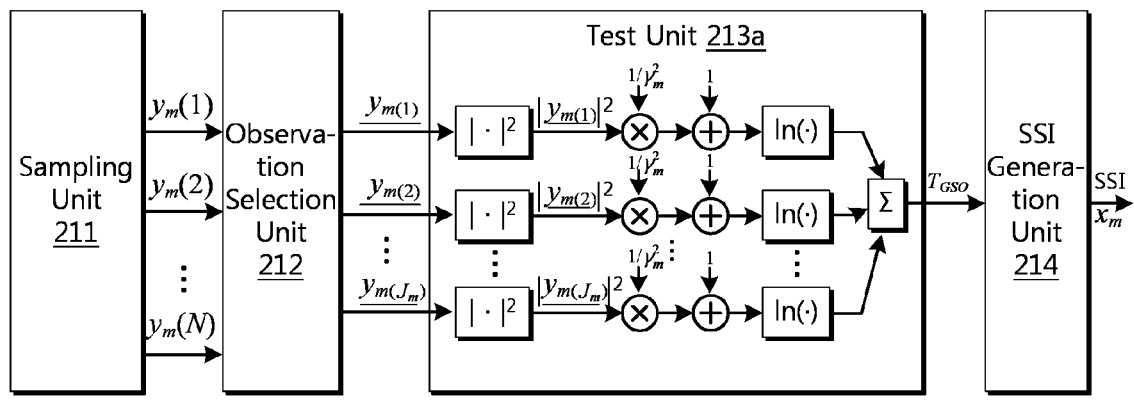
FIG. 3 is a block diagram illustrating the spectrum sensing unit of a CR for a CCR network in a non-Gaussian noise environment according to an embodiment of the present invention when the CR operates in a Cauchy noise environment.
Figure 4:
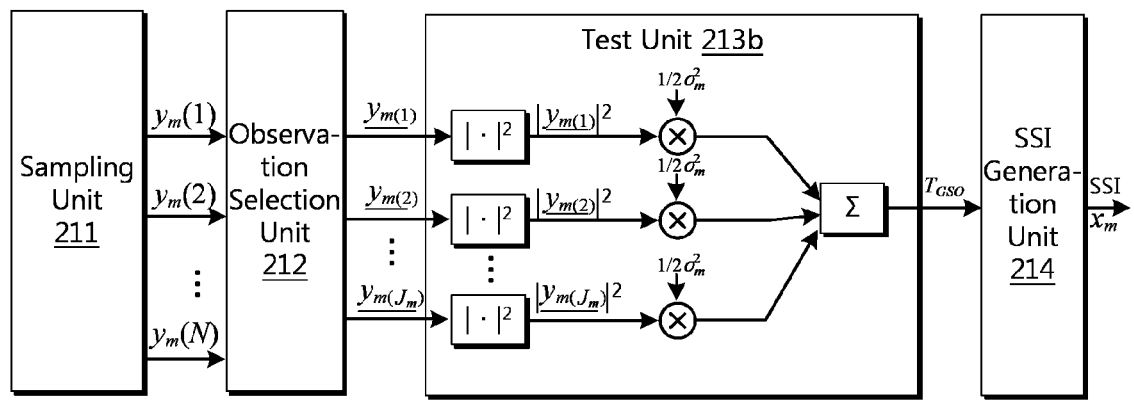
FIG. 4 is a block diagram illustrating the spectrum sensing unit of a CR for a CCR network in a non-Gaussian noise environment according to an embodiment of the present invention when the CR operates in a Gaussian noise environment.

Meanwhile, FIGS. 3 and 4 are detailed block diagrams of the spectrum sensing unit of a CR for a CCR network in a non-Gaussian noise environment according to an embodiment of the present invention when the CR operates in Cauchy and Gaussian noise environments.

Referring to FIGS. 3 and 4, in the spectrum sensing unit 21 of the CR 20, the sampling unit 211 samples a received baseband signal, and then transfers an observation vector $\underline{y_m} = \{y_m(1), y_m(2), \ldots, y_m(N)\}$ composed of N sampled observations to the observation selection unit 212.

The observation selection unit 212 selects $J_m$ observations from an order statistic $\{\underline{y_{m(1)}}, \underline{y_{m(2)}}, \ldots, \underline{y_{m(N)}}\}$, obtained by rearranging the observation vector $\underline{y_m}$ in ascending order of size, in ascending order of size, and then transfers the $J_m$ selected observations to the test unit 213.

The test unit 213a of FIG. 3 calculates a test statistic $T_{GSO}(\underline{y_m}, J_m) = G_C(\underline{y_m}, J_m)$ according to a GLRT based on the $J_m$ selected observations (GSO) in the Cauchy noise environment in accordance with Equation 11.

More specifically, in accordance with Equation 11, the test unit 213a of FIG. 3 calculates the test statistic $T_{GSO}(\underline{y_m}, J_m) = G_C(\underline{y_m}, J_m)$ by squaring the absolute value of each of the selected observations $y_{m(l)}$, dividing the squared value by $\gamma_m^2$, adding 1 to the result of the division, obtaining the natural logarithm of the result of the addition, and then summing all natural logarithms.

Similarly, in accordance with Equation 12, the test unit 213b of FIG. 4 calculates the test statistic $T_{GSO}(\underline{y_m}, J_m) = G_C(\underline{y_m}, J_m)$ by squaring the absolute value of each of the selected observations $y_{m(l)}$, dividing the squared value by $2\sigma_m^2$, and then summing the results of the division.

Referring back to FIG. 2, in each of the noise environments, the SSI generation unit 214 determines whether the received baseband signal is a PU signal by comparing the calculated test statistic with the given local threshold, and then generates SSI.

More specifically, the SSI generation unit 214 may receive the GSO test statistic $T_{GSO}(\underline{y_m}, J_m)$ based on the $J_m$ selected observations of the observation vector $\underline{y_m}$ from the test unit 213, and may generate a binary SSI value $x_m$ from the result of comparison with a predetermined local threshold $\lambda_m$, as shown in Equation 13. The local threshold $\lambda_m$ is an individual threshold based on a false alarm probability given to or design allowable for the m-th CR.

$$x_m = \begin{cases} 1, & \text{if } T_{GSO}(\underline{y_m}, J_m) \geq \lambda_m \\ 0, & \text{otherwise} \end{cases} \quad (13)$$

The fact that the binary SSI value $x_m$ is 1 means that the hypothesis $H_1$ in which a PU spectrum is being occupied by the m-th CR is judged to be correct. In contrast, the fact that the binary SSI value $x_m$ is 0 means that the hypothesis $H_1$ in which a PU spectrum is being occupied by the m-th CR is judged to be incorrect.

Referring back to FIG. 1, the PU signal determination unit 121 of the FC 12 receives M pieces of SSI from M CRs.

Accordingly, the PU signal determination unit 121 comes to have a set $\underline{x} = [x_1, x_2, \ldots, x_M]$ of M pieces of SSI $x_m$, and calculates a joint test statistic $T_{FC}(\underline{x})$ using these M pieces of SSI, as shown in the following Equation 14:

$$\left(T_{FC}(\underline{x}) = \sum_{m=1}^{M} x_m\right) \overset{H_1}{\underset{H_0}{\gtrless}} \lambda_{FC} \quad (14)$$

More specifically, the PU signal determination unit 121 calculates the joint test statistic $T_{FC}(\underline{x})$ by counting the number of pieces of SSI $x_m$ having a value of 1, indicating that the hypothesis $H_1$ has been verified at a corresponding CR, in the set $\underline{x} = [x_1, x_2, \ldots, x_M]$ of M pieces of SSI $x_m$, as shown in Equation 14, and compares the calculated joint test statistic $T_{FC}(\underline{x})$ with a joint threshold $\lambda_{FC}$ given in accordance with predetermined counting rules or determined by the threshold optimization unit 122 such that the expected average throughput of a SU signal can be maximized based on a given communication environment including a maximum interference condition, thereby selecting one of the hypothesis $H_1$ in which the PU signal occupies the spectrum and thus the corresponding spectrum cannot be used and the hypothesis $H_0$ in which the spectrum is empty, and thus finally determining whether the PU signal is present in the corresponding spectrum.

In an embodiment, the joint threshold $\lambda_{FC}$ according to the predetermined counting rules may be determined to be M in the case of a AND rule, 1 in the case of an OR rule, and $\lceil M/2 \rceil$ in the case of a majority (MJ) rule. In this case, $\lceil x \rceil$ is a ceiling function, and represents the smallest integer that is larger than or equal to x.

In another embodiment, the joint threshold $\lambda_{FC}$ according to the counting rules may be optimally determined based on a communication environment.

The threshold optimization unit 122 determines the joint threshold $\lambda_{FC}$ that can maximize the expected average throughput of the SU signal based on a given communication environment including a maximum interference condition, and provides the joint threshold $\lambda_{FC}$ to the PU signal determination unit 121.

When it is determined that the PU signal is present in the band if the joint threshold $\lambda_{FC}$ is smaller than an optimum value for a given communication environment, that is, if a small number of CRs report the detection of the PU signal, the false alarm probability increases, so that a situation may occur in which the SU cannot use the band and thus transmission performance is reduced because a state in question is erroneously determined to be an occupied state in spite of an actual state in which the SU can use the band. However, in this case, the probability of determining an occupied state in which the band is being occupied by the PU to be an idle state is reduced, and thus the possibility of the PU signal being interfered with by the SU signal is reduced.

In contrast, when it is determined that the PU signal is present in the band if the joint threshold $\lambda_{FC}$ is excessively larger than the optimum value for a given communication environment, that is, if a large number of CRs report the detection of the PU signal, the false alarm probability is reduced, so that the frequency at which the SU uses the band increases and thus the transmission performance of the SU can be expected to increase. However, in this case, the probability of not detecting the PU signal even when the PU signal is present increases, and thus the possibility of the PU signal being interfered with by the SU signal increases.

Accordingly, the joint threshold $\lambda_{FC}$ needs to be determined to be an optimum value within the range between a value that can minimize the possibility of the PU signal being interfered with and a value that can maximize the transmission performance of the SU.

In this case, since the possibility of the interference cannot be completely avoided, the joint threshold $\lambda_{FC}$ can be more easily optimized if a specific maximum interference condition is given to a CCR system as a type of maximum allowable design error like the false alarm probability.

More specifically, the optimization of the joint threshold $\lambda_{FC}$ may be performed using well-known various optimization schemes if an optimization problem can be designed to maximize the expected average throughput of the SU signal based on a given communication environment including a maximum interference condition.

By way of example, in the present invention, in order to find the joint threshold $\lambda_{FC}$ that can maximize the transmission performance of the SU signal when a condition in which interference that the SU signal imposes upon the PU signal is limited to a specific level is met, the above issue may be summarized as a convex optimization problem, as given by the following Equation 15, on the actual assumption that the false alarm probability or the missed detection probability will be equal to or lower than 0.5:

$$\max \sum_{x=0}^{\lambda_{FC}-1} (1-p_{fa})^{M-x}(p_{fa})^x \, {}_MC_{M-x} \times R \quad (15)$$

$$\text{such that} \sum_{x=0}^{\lambda_{FC}-1} (1-p_d)^{M-x}(p_d)^2 \, {}_MC_{M-x} \times C \leq \epsilon$$

$$0 \leq \lambda_{FC} \leq M$$

where $p_{fa}$ is the false alarm probability of any one CR, $p_d$ is the detection probability of the one CR, R is the designed throughput of the SU signal, x is the number of CRs that belong to the M CRs and also detect the PU signal, ${}_MC_{M-x}$ is a combination indicative of the number of cases where M-x CRs are selected from among the M CRs, C is the magnitude of interference that the SU signal imposes upon the PU signal, and $\epsilon$ is a given maximum interference magnitude condition.

In other words, Equation 15 means the finding of $\lambda_{FC}$ that satisfies $$\sum_{x=0}^{\lambda_{FC}-1} (1-p_d)^{M-x}(p_d)^2 \, {}_MC_{M-x} \times C \leq \epsilon \text{ and}$$

$$0 \leq \lambda_{FC} \leq M$$

and that maximizes $$\sum_{x=0}^{\lambda_{FC}-1} (1-p_{fa})^{M-x}(p_{fa})^x \, {}_MC_{M-x} \times R.$$

$$\sum_{x=0}^{\lambda_{FC}-1} (1-p_{fa})^{M-x}(p_{fa})^x \, {}_MC_{M-x}$$

is the probability of the FC determining that the PU signal is not present if the PU signal is not actually present. The average throughput that is expected when, as a result of this determination, it is determined that the SU uses the band is $$\sum_{x=0}^{\lambda_{FC}-1} (1-p_{fa})^{M-x}(p_{fa})^x \, {}_MC_{M-x} \times R.$$

Meanwhile, $$\sum_{x=0}^{\lambda_{FC}-1} (1-p_d)^{M-x}(p_d)^x \, {}_MC_{M-x}$$

is the missed detection probability with which the FC determines that the PU signal is not present even when the PU signal is actually present.

$$\sum_{x=0}^{\lambda_{FC}-1} (1-p_d)^{M-x}(p_d)^x {}_M C_{M-x} \times C,$$

that is, the magnitude of average interference between the PU signal and the SU signal, may be obtained by multiplying $$\sum_{x=0}^{\lambda_{FC}-1} (1-p_d)^{M-x}(p_d)^x {}_M C_{M-x}$$

by C, that is, the numerical value of the interference.

When the maximum interference magnitude condition $\epsilon$ is low, the transmission chance of the SU signal that generates interference and throughput are more limited, but the interference that is experienced by the PU signal is reduced. In contrast, when the maximum interference magnitude condition $\epsilon$ is high, the transmission chance of the SU signal that generates interference and throughput are more allowed, but the interference that is experienced by the PU signal increases.

In Equation 15, the parameters $p_{fa}$, $p_d$, R, C, and $\epsilon$ are values given or determined appropriately, and thus the optimization of the joint threshold $\lambda_{FC}$ may be performed via Equation 15.

Accordingly, the optimum joint threshold $\lambda_{FC}$ may be determined based on a communication system or a communication environment by making the maximum interference magnitude condition strict, for example, determining the optimum joint threshold $\lambda_{FC}$ to be a relatively small value, in a communication environment in which the PU signal is vulnerable to interference and the interference of the SU signal should be minimized, and by making the maximum interference magnitude condition moderate, for example, determining the optimum joint threshold $\lambda_{FC}$ to be a relatively large value, in a communication environment in which the PU signal is robust to interference and the throughput of the SU signal is important.

If it is assumed that the maximum interference condition is the strictest, the threshold optimization unit 122 will determine the joint threshold $\lambda_{FC}$ to be 1, which corresponds to a counting rule that determines that a PU signal is present when even a single CR detects the PU signal. Accordingly, this joint threshold $\lambda_{FC}$ is substantially the same as the joint threshold $\lambda_{FC}$ for an OR rule.

In contrast, if it is assumed that the maximum interference condition is most moderate, the threshold optimization unit 122 will determine the joint threshold $\lambda_{FC}$ to be M, which corresponds to a counting rule that determines that a PU signal is present only if all CRs detect the PU signal. Accordingly, this joint threshold $\lambda_{FC}$ is substantially the same as the joint threshold $\lambda_{FC}$ for a AND rule.

Figure 5:
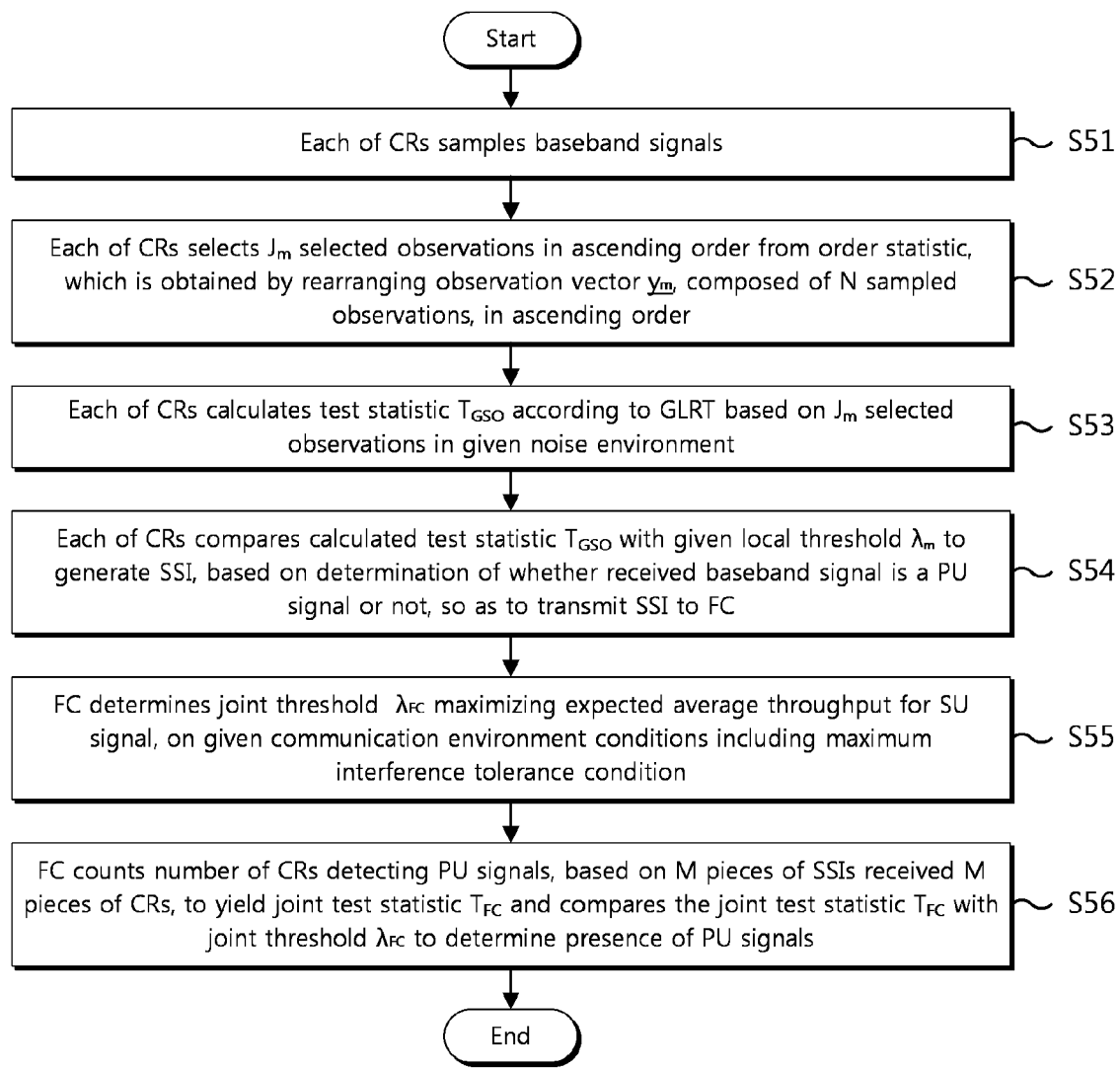
FIG. 5 illustrates a spectrum sensing method for a CCR system in a non-Gaussian noise environment according to an embodiment of the present invention.

FIG. 5 illustrates a spectrum sensing method for a CCR system in a non-Gaussian noise environment according to an embodiment of the present invention.

Referring to FIG. 5, in the spectrum sensing method of the CCR system 10 including M CRs 11 and an FC 12, each of the CRs 11 samples a received baseband signal at step S51.

At step S52, each of the CRs 11 selects $J_m$ observations from an order statistic $\{y_{m(1)}, y_{m(2)}, \ldots, y_{m(N)}\}$, obtained by rearranging the observation vector $y_m$ including sampled N observations in ascending order of size, in ascending order of size.

At step S53, each of the CRs 11 calculates a test statistic $T_{GSO}(y_m, J_m) = G_C(y_m, J_m)$ according to a GLRT based on the $J_m$ selected observations (GSO) in a given noise environment.

In this case, when the given noise environment is a Cauchy noise environment, the test statistic may be calculated in accordance with Equation 11.

Similarly, when the given noise environment is a Gaussian noise environment, the test statistic may be calculated in accordance with Equation 12.

At step S54, each of the CRs 11 generates SSI based on the determination of whether the received baseband signal is a PU signal performed by comparing the calculated test statistic $T_{FC}(x)$ with a given local threshold, and then transmits the generated SSI to the FC 12.

At step S55, the FC 12 determines a joint threshold $\lambda_{FC}$ that can maximize the expected average throughput of a SU signal based on the given communication environment including a maximum interference condition.

More specifically, the threshold optimization unit 122 of the FC 12 determines the joint threshold $\lambda_{FC}$ to be a value that can maximize the expected average throughput of the SU signal based on a given maximum interference condition, the number of CRs, a false alarm probability, a detection probability, the designed throughput of the SU signal, and the magnitude of interference imposed on a PU signal by the SU signal.

At step S56, the FC 12 calculates the joint test statistic $T_{FC}(x)$ by counting the number of CRs 11 that detect the PU signal from M pieces of SSI received from the M CRs 11, and determines whether the PU signal is present by comparing the calculated joint test statistic $T_{FC}(x)$ with the joint threshold $\lambda_{FC}$ given in accordance with specific counting rules or determined appropriately.

In this case, in an embodiment, the joint threshold $\lambda_{FC}$ according to the predetermined counting rules may be determined to be M in the case of a AND rule, 1 in the case of an OR rule, and $\lceil M/2 \rceil$ in the case of an MJ rule. In this case, $\lceil x \rceil$ is a ceiling function, and represents the smallest integer that is larger than or equal to x.

Figure 6:
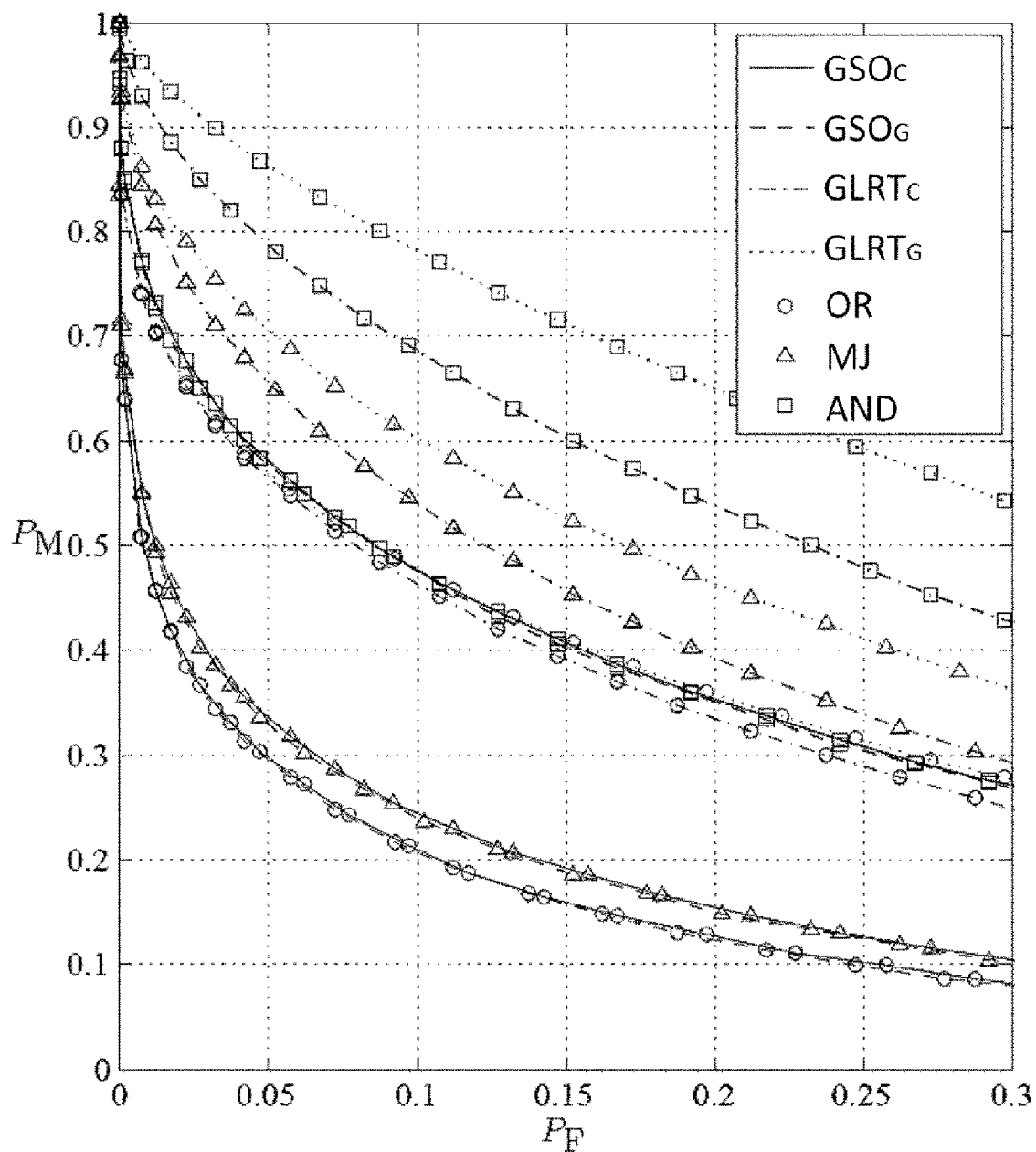
FIGS. 6 to 8 are graphs indicating that receiver operation characteristic (ROC) performance varies depending on a different noise environment and counting rule in a CCR system using a CCR network in a non-Gaussian noise environment according to an embodiment of the present invention.
Figure 7:
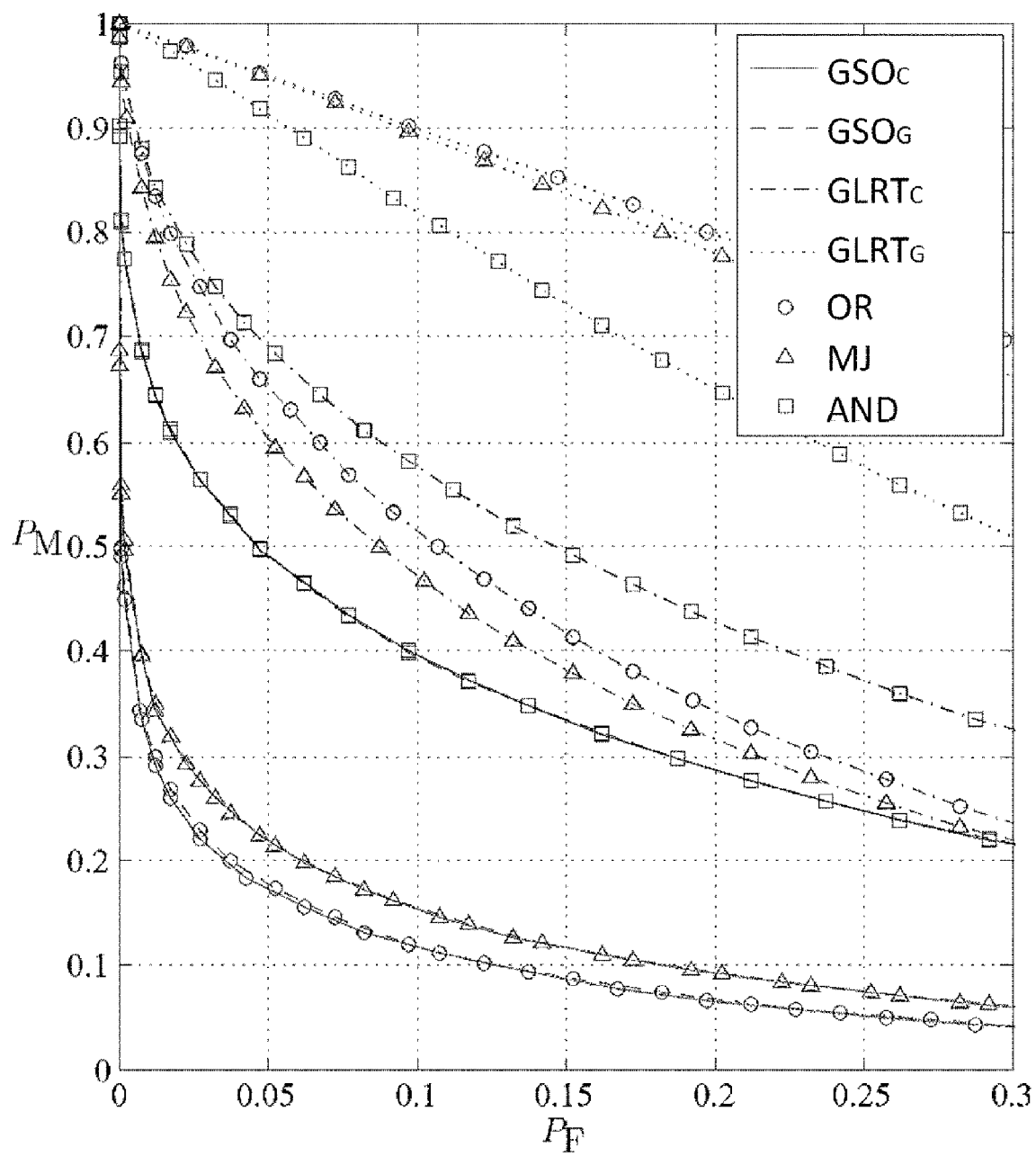
Figure 8:
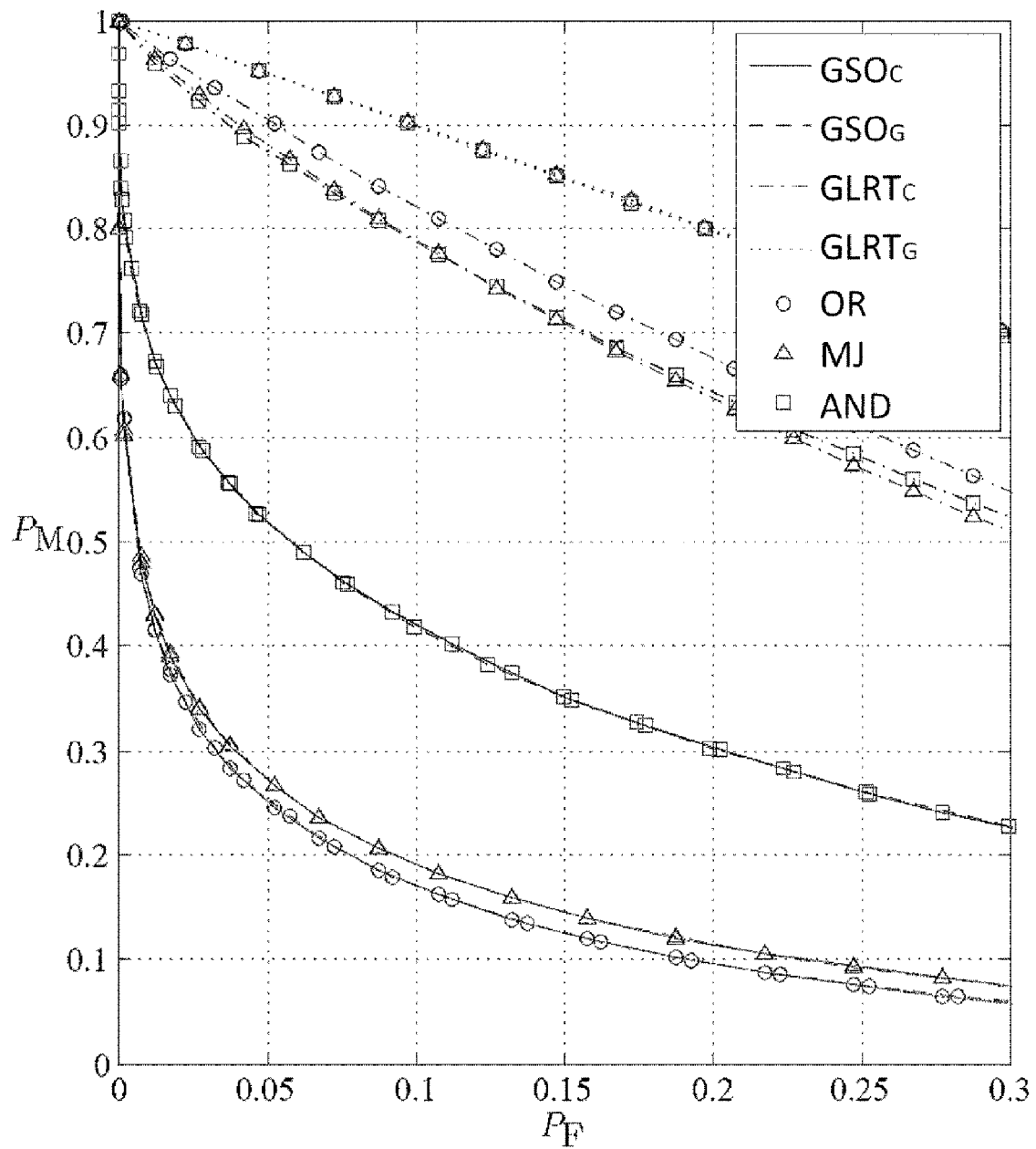

FIGS. 6 to 8 are graphs indicating that receiver operation characteristic (ROC) performance varies depending on a different noise environment and counting rule in a CCR system using a CCR network in a non-Gaussian noise environment according to an embodiment of the present invention.

Referring to FIGS. 6 to 8, in order to determine the performance of the present invention, a CCR system including four CRs was constructed in a noise environment that has been BIS$\alpha$S-modeled to be $\gamma=1$, and ROC performance was simulated. The number of CRs is four, the number of samples is 50, and local thresholds are all the same.

First, the following Table 1 lists $\alpha$ values for BIS$\alpha$S modeling for each noise environment:

TABLE 1

| Noise environment | First CR | Second CR | Third CR | Fourth CR |
|---|---|---|---|---|
| noise environment 1 | 2 | 2 | 1 | 1 |
| noise environment 2 | 1.5 | 1.5 | 1.5 | 1.5 |
| noise environment 3 | 1 | 1 | 1 | 1 |

In noise environment 1, two CRs are operating in a Gaussian noise environment where α=2, and two CRs are operating in a Cauchy noise environment where α=1. In noise environment 2, four CRs are all operating in an environment where α=1.5. In noise environment 3, four CRs are operating in an environment where α=1. The noise environment 2 has more impulsive noise components than the noise environment 1, and noise environment 3 has more impulsive noise components than the noise environment 2.

The legends of FIGS. 6 to 8 indicate GSO test statistic calculation methods ($GSO_C$ and $GSO_G$), conventional GLRT test statistic calculation methods ($GLRT_C$ and $GLRT_G$) and three characteristic counting rules (OR, MJ and AND) in two noise environments according to the present invention. A total of 12 curves are drawn based on the combinations thereof. The subscripts "C" and "G" represent respective test statistic methods in Cauchy and Gaussian noise environments.

For example, a dotted line curve (- - ○ - - ○ - -) connected by "○"s is a performance index curve that is obtained when whether a PU signal is present is determined based on a plurality of pieces of SSI generated using the GSO test statistic calculation method of the present invention in accordance with an OR rule in which the joint threshold $\lambda_{FC}$ is 1 in the Cauchy noise environment.

For each of the curves, false alarm probabilities $P_F$ are plotted on a lateral axis as ROC performance indices, and the missed detection probabilities $P_M$ are plotted on a vertical axis.

In other words, each of the curves indicates missed detection probabilities based on the combinations of specific test statistics and counting rules with respect to given false alarm probabilities. The spectrum sensing performance of the CCR system may be interpreted as being high when the missed detection probability is low with respect to the same false alarm probability.

Referring to FIG. 6, in the case of the noise environment 1 in which two CRs are operating in a Gaussian noise environment where α=2 and two CRs are operating in a Cauchy noise environment where α=1 and in a situation where the same false alarm probability, for example, $P_F$=0.1, is given, the missed detection probability $P_M$ is approximately 0.8 for the AND rule, approximately 0.6 for the MJ rule and approximately 0.5 for the OR rule in the conventional $GLRT_G$ method, and the missed detection probability $P_M$ is approximately 0.7 for the AND rule and approximately 0.5 for the OR and MJ rules in the conventional $GLRT_C$ method. The values are high.

In contrast, in the $GSO_G$ method of the present invention, the missed detection probability $P_M$ is approximately 0.5, that is, not good, for the AND rule and approximately 0.2 to 0.3, that is, considerably improved, for the OR and MJ rules. In the $GSO_C$ method of the present invention, the missed detection probability $P_M$ is approximately 0.5, that is, not good, for the AND rule and approximately 0.2 to 0.3, that is, considerably improved, for the OR and MJ rules.

Referring to FIG. 7, in the case of the noise environment 2 where α=1.5 for all the four CRs and in a situation where the same false alarm probability, for example, $P_F$=0.1, is given, the missed detection probability $P_M$ is approximately 0.9, that is, very high, for all the counting rules in the conventional $GLRT_G$ method, and the missed detection probability $P_M$ is somewhat improved, that is, approximately 0.5 and high, for all the counting rules in the conventional $GLRT_C$ method.

In contrast, the missed detection probability $P_M$ is approximately 0.1 to 0.2, that is, considerably improved, for the OR and MJ rules and approximately 0.4, that is, somewhat improved, for the AND rule in the $GSO_G$ method of the present invention, and similarly the missed detection probability $P_M$ is approximately 0.1 to 0.2, that is, considerably improved, for the OR and MJ rules and approximately 0.4, that is, somewhat improved, for the AND rule in the $GSO_C$ method of the present invention.

Referring to FIG. 8, in the case of the noise environment 3 where the four CRs are all operating in a Cauchy noise environment where α=1 and in a situation where the same false alarm probability, for example, $P_F$=0.1, is given, the missed detection probability $P_M$ is approximately 0.9, that is, very high, for all the counting rules in the conventional $GLRT_G$ method, and the missed detection probability $P_M$ is approximately 0.8, that is, very high, for all the counting rules also in the conventional $GLRT_G$ method.

In contrast, the missed detection probability $P_M$ is approximately 0.1 to 0.2, that is, considerably improved, for the OR and MJ rules and approximately 0.4, that is, somewhat improved, for the AND rule in the $GSO_G$ method of the present invention, and similarly the missed detection probability $P_M$ is approximately 0.1 to 0.2, that is, considerably improved, for the OR and MJ rules and approximately 0.4, that is, somewhat improved, for the AND rule in the $GSO_C$ method of the present invention.

A spectrum sensing apparatus and method for a CCR network in a non-Gaussian noise environment and an FC apparatus and CCR system using the spectrum sensing apparatus and method according to some embodiments of the present invention have the advantage of determining whether a PU signal has occupied a band using counting rules based on optimized thresholds that can maximize the expected throughput of an SU signal under various scenarios.

A spectrum sensing apparatus and method for a CCR network in a non-Gaussian noise environment and an FC apparatus and CCR system using the spectrum sensing apparatus and method according to some embodiments of the present invention have the advantage of making a determination in accordance with an OR rule in a scenario in which a PU should not be interfered with and thus determining that a PU signal is present if even a single CR detects the PU signal, and making a determination in accordance with an AND rule or an MJ rule and thus determining that a PU signal is present only if all CRs or a majority of CRs detect the PU signal.

Although the present invention has been described based on the limited embodiments and diagrams, the present invention is not limited to the embodiments, but those having ordinary knowledge in the art to which the present invention pertains can make various modifications and variations based on the above description. Accordingly, the spirit of the present invention should be defined based on only the following claims, and equivalent modifications and variations all fall within the scope of the spirit of the present invention.

Furthermore, the apparatuses according to the present invention may be implemented as computer-readable code on a computer-readable storage medium. The computer-readable storage medium may include all types of storage devices that store data that can be read by a computer system. Examples of the storage medium include read only memory (ROM), random access memory (RAM), an optical disk, magnetic tape, a floppy disk, a hard disk, non-volatile memory, etc. Furthermore, the storage medium may be implemented as carrier waves (for example, in the case of transmission over the Internet). Moreover, the computer-readable medium may be distributed across a computer system connected via a network, and thus computer-readable code can be stored and executed in a distributed manner.

What is claimed is:

1. A cooperative cognitive radio (CCR) apparatus, comprising:
M cognitive radios (CRs), each CR configured to sample a baseband signal and to determine whether a primary user (PU) is currently occupying a frequency spectrum band assigned to the PU, and to generate spectrum sensing information (SSI) indicating that a PU signal has been detected based on the sampling;
a fusion center (FC) configured to determine a joint threshold $\lambda_{FC}$ that can maximize an expected average throughput of a secondary user (SU) signal in a given communication environment including a maximum interference condition, to calculate a joint test statistic from M pieces of SSI received from the respective M CRs when receiving the M pieces of SSI from the respective M CRs, and to determine whether the PU signal is present by comparing the calculated joint test statistic with the joint threshold $\lambda_{FC}$;
a PU signal determiner configured to receive the M pieces of SSI from the respective M CRs, and to determine whether the PU signal is present based on the joint test statistic; and
a threshold optimizer configured to:
determine the joint threshold $\lambda_{FC}$ that can maximize an expected average throughput of the SU signal based on a given communication environment including a maximum interference condition; and
determine the joint threshold $\lambda_{FC}$ to be 1 and a corresponding counting rule to be an OR rule, or to determine the joint threshold $\lambda_{FC}$ to be M and a corresponding counting rules to be an AND rule, based on the given maximum interference condition.

2. The CCR apparatus of claim 1, wherein the threshold optimizer is further configured to determine the joint threshold $\lambda_{FC}$ to be a value that can maximize the expected average throughput of the SU signal based on a given maximum interference condition, the number of CRs, a false alarm probability, a detection probability, the designed throughput of the SU signal, and the magnitude of interference imposed on a PU signal by the SU signal.

3. The CCR apparatus of claim 2, wherein the threshold optimizer is further configured to determine the joint threshold $\lambda_{FC}$ to be a value that satisfies the following equation:

$$\max \sum_{x=0}^{\lambda_{FC}-1} (1-p_{fa})^{M-x}(p_{fa})^x {}_MC_{M-x} \times R$$

$$\text{such that } \sum_{x=0}^{\lambda_{FC}-1} (1-p_d)^{M-x}(p_d)^2 {}_MC_{M-x} \times C \le \epsilon$$

$$0 \le \lambda_{FC} \le M$$

where $p_{fa}$ is a false alarm probability of any one CR, $p_d$ is a detection probability of the CR, R is the designed throughput of the SU signal, x is the number of CRs that belong to the M CRs and also detect the PU signal, ${}_MC_{M-x}$ is a combination indicative of the number of cases where M-x CRs are selected from among the M CRs, C is the magnitude of interference that the SU signal imposes upon the PU signal, and $\epsilon$ is a given maximum interference magnitude condition.

4. The CCR apparatus of claim 1, wherein the FC further comprises:
a dynamic band manager configured to continuously manage information about a band in which a PU signal is present and an empty band throughout overall spectrum, and to perform control depending on a band use request from an SU and a determination of whether the PU signal is present so that the empty band is assigned to the SU or a band that is being use by the SU is withdrawn or changed.

5. The CCR apparatus of claim 1, wherein the CR comprises a spectrum sensor configured to generate the SSI indicating that the PU signal has been detected based on results of the sampling; and
wherein the spectrum sensor further comprises:
a sampler configured to sample the received baseband signal, and to generate an observation vector $y_m = (y_m(1), y_m(2), \ldots, y_m(N))$ (m is an integer that satisfies $1 \le m \le M$) composed of N sampled observations;
an observation selection unit configured to select $J_m$ ($J_m$ is an integer that satisfies $1 \le J_m \le N$) observations from an order statistic $\{y_{m(1)}, y_{m(2)}, \ldots, y_{m(N)}\}$, obtained by rearranging the observation vector $y_m$ in ascending order of size, in ascending order of size;
a test unit configured to calculate a test statistic $T_{GSO}(y_m, J_m)$ according to a generalized likelihood ratio test (GLRT) based on the $J_m$ selected observations (GSO) in a given noise environment; and
an SSI generator configured to determine whether the received baseband signal is a PU signal by comparing the calculated test statistic $T_{GSO}(y_m, J_m)$ with a given local threshold $\lambda_m$ and then generate the SSI.

6. The CCR apparatus of claim 5, wherein the test unit, when a non-Gaussian impulsive noise environment is modeled to follow a bivariate isotropic symmetric α-stable (BIS αS) distribution, calculates a test statistic $T_{GSO}(y_m, J_m) = G_C(y_m, J_m)$ by squaring an absolute value of an l-th (l is an integer that satisfies $1 \le l \le k$) selected observation $y_{m(l)}$ of an m-th (m is an integer that satisfies $1 \le m \le M$) CR, dividing the squared value by $\gamma_m^2$, adding 1 to a result of the division, obtaining a natural logarithm of a result of the addition, and summing natural logarithms, in accordance with the following equation:

$$G_C(\underline{y_m}, k) = \sum_{l=1}^{k} \ln\left\{1 + \frac{|y_{m(l)}|^2}{\gamma_m^2}\right\}$$

where $k = J_m$, and $\gamma_m$ is a dispersion of a probability density function (PDF) of a BIS αS distribution of the m-th CR.

7. The CCR apparatus of claim 5, wherein the test unit, when a non-Gaussian impulsive noise environment is modeled to follow a BIS αS distribution, calculates a test statistic $T_{GSO}(y_m, J_m) = G_G(y_m, J_m)$ by squaring an absolute value of an l-th (l is an integer that satisfies $1 \le l \le k$) selected observation $y_{m(l)}$ of an m-th (m is an Integer that satisfies $1 \le m \le M$) CR, dividing the squared value by $2\sigma_m^2$, and summing results of the division, in accordance with the following equation:

$$G_G(\underline{y_m}, k) = \frac{1}{2\sigma_m^2} \sum_{l=1}^{k} |y_{m(l)}|^2$$

where $k=J_m$, and $2\sigma_m^2$ is a dispersion of a PDF of a BIS αS distribution of the m-th CR.

8. The CCR apparatus of claim 5, wherein the SSI generator is further configured to receive the test statistic $T_{GSO}(y_m,J_m)$ based on the $J_m$ selected observations of the observation vector $y_m$ from the test unit, and to generate the SSI using a binary SSI value $x_m$ in accordance with the following equation:

$$x_m = \begin{cases} 1, & \text{if } T_{GSO}(y_m, J_m) \geq \lambda_m \\ 0, & \text{otherwise} \end{cases}$$

where the threshold $\lambda_m$ is an individual threshold given to the m-th CR.

9. An FC for a CCR network, comprising:
a PU signal determiner configured to receive M pieces of SSI from M CRs constituting the CCR network, to calculate a joint test statistic from the received M pieces of SSI, and to determine whether a PU signal is present by comparing the calculated joint test statistic with a joint threshold $\lambda_{FC}$;
a threshold optimizer configured to:
determine the joint threshold $\lambda_{FC}$ to be a value that can maximize the expected average throughput of the SU signal based on a given communication environment including a maximum interference condition, the number of CRs, a false alarm probability, a detection probability, the designed throughput of the SU signal, and the magnitude of interference imposed on a PU signal by the SU signal; and
determine the joint threshold $\lambda_{FC}$ to be 1 and a corresponding counting rule to be an OR rule, or to determine the joint threshold $\lambda_{FC}$ to be M and a corresponding counting rules to be an AND rule, based on the given maximum interference condition; and
a dynamic band manager configured to continuously manage information about a band in which a PU signal is present and an empty band throughout overall spectrum, and to perform control depending on a band use request from an SU and a determination of whether the PU signal is present so that the empty band is assigned to the SU or a band that is being used by the SU is withdrawn or changed.

10. The FC of claim 9, wherein the threshold optimizer is further configured to determine the joint threshold $\lambda_{FC}$ to be a value that satisfies the following equation:

$$\max \sum_{x=0}^{\lambda_{FC}-1} (1-p_{fa})^{M-x}(p_{fa})^x \,_M C_{M-x} \times R$$

$$\text{such that } \sum_{x=0}^{\lambda_{FC}-1} (1-p_d)^{M-x}(p_d)^2 \,_M C_{M-x} \times C \leq \epsilon$$

$$0 \leq \lambda_{FC} \leq M$$

where $p_{fa}$ is a false alarm probability of any one CR, $p_d$ is a detection probability of the CR, R is the designed throughput of the SU signal, x is the number of CRs that belong to the M CRs and also detect the PU signal, $_M C_{M-x}$ is a combination Indicative of the number of cases where M-x CRs are selected from among the M CRs, C is the magnitude of interference that the SU signal imposes upon the PU signal, and ϵ is a given maximum interference magnitude condition.

11. A spectrum sensing method for a CCR apparatus including M CRs and an FC, the method comprising:
sampling, by each of the M CRs, a received baseband signal;
selecting, by each of the M CRs, $J_m$ ($J_m$ is an integer that satisfies $1 \leq J_m \leq N$) selected observations from an order statistic $\{y_{m(1)}, y_{m(2)}, \ldots, y_{m(N)}\}$, obtained by rearranging the observation vector $y_m$ (m is an integer that satisfies $1 \leq m \leq M$) composed of N sampled observations in ascending order of size, in ascending order of size;
calculating, by each of the M CRs, a test statistic $T_{GSO}(y_m,J_m)$ according to a GLRT based on the $J_m$ selected observations (GSO) in a given noise environment;
determining, by each of the M CRs, whether the received baseband signal is a PU signal by comparing the calculated test statistic $T_{GSO}(y_m,J_m)$ with a given local threshold $\lambda_m$, generating, by each of the M CRs, SSI based on a result of the determination, and transmitting, by each of the M CRs, the SSI to an FC;
determining, by the FC, a joint threshold $\lambda_{FC}$ that can maximize an expected average throughput of an SU signal based on a given communication environment including a maximum interference condition; and
calculating, by the FC, a joint test statistic from M pieces of SSI received from M CR, and determining, by the FC, whether a PU signal is present by comparing the calculated joint test statistic with the joint threshold $\lambda_{FC}$.

12. The method of claim 11, wherein determining, by the FC, the joint threshold $\lambda_{FC}$ the threshold optimization unit comprises:
determining the joint threshold $\lambda_{FC}$ to be a value that can maximize the expected average throughput of the SU signal based on a given maximum interference condition, the number of CRs, a false alarm probability, a detection probability, the designed throughput of the SU signal, and the magnitude of interference imposed on a PU signal by the SU signal.

13. The method of claim 12, wherein determining, by the FC, the joint threshold $\lambda_{FC}$ the threshold optimization unit comprises:
determining the joint threshold $\lambda_{FC}$ to be a value that satisfies the following equation:

$$\max \sum_{x=0}^{\lambda_{FC}-1} (1-p_{fa})^{M-x}(p_{fa})^x \,_M C_{M-x} \times R$$

$$\text{such that } \sum_{x=0}^{\lambda_{FC}-1} (1-p_d)^{M-x}(p_d)^2 \,_M C_{M-x} \times C \leq \epsilon$$

$$0 \leq \lambda_{FC} \leq M$$

where $p_{fa}$ is a false alarm probability of any one CR, $p_d$ is a detection probability of the CR, R is the designed throughput of the SU signal, x is the number of CRs that belong to the M CRs and also detect the PU signal, $_M C_{M-x}$ is a combination indicative of the number of cases where M-x CRs are selected from among the M CRs, C Is the magnitude of interference that the SU signal imposes upon the PU signal, and ϵ is a given maximum interference magnitude condition.

14. The method of claim 11, wherein determining, by the FC, the joint threshold $\lambda_{FC}$ the threshold optimization unit comprises:

determining the joint threshold $\lambda_{FC}$ to be 1 and a corresponding counting rule to be an OR rule, or determining the joint threshold $\lambda_{FC}$ to be M and a corresponding counting rules to be an AND rule, based on the given maximum interference condition.

15. The method of claim 11, wherein calculating the test static $T_{GSO}(y_m, J_m)$ comprises:

calculating, when a non-Gaussian impulsive noise environment is modeled to follow a bivariate isotropic symmetric α-stable (BIS αS) distribution, a test statistic $T_{GSO}(y_m, J_m) = G_C(y_m, J_m)$ by squaring an absolute value of an l-th (l is an integer that satisfies $1 \leq l \leq k$) selected observation $y_{m(l)}$ of an m-th (m is an integer that satisfies $1 \leq m \leq M$) CR, dividing the squared value by $\gamma_m^2$, adding 1 to a result of the division, obtaining a natural logarithm of a result of the addition, and summing natural logarithms, in accordance with the following equation:

$$G_C(\underline{y_m}, k) = \sum_{l=1}^{k} \ln\left\{1 + \frac{|y_{m(l)}|^2}{\gamma_m^2}\right\}$$

where $k = J_m$, and $\gamma_m$ is a dispersion of a probability density function (PDF) of a BIS αS distribution of the m-th CR.

16. The method of claim 11, wherein calculating the test static $T_{GSO}(y_m, J_m)$ comprises:

calculating, when a non-Gaussian impulsive noise environment is modeled to follow a BIS αS distribution, a test statistic $T_{GSO}(y_m, J_m) = G_G(y_m, J_m)$ by squaring an absolute value of an l-th (l is an integer that satisfies $1 \leq l \leq k$) selected observation $y_{m(l)}$ of an m-th (m is an integer that satisfies $1 \leq m \leq M$) CR, dividing the squared value by $2\sigma_m^2$, and summing results of the division, in accordance with the following equation:

$$G_G(\underline{y_m}, k) = \frac{1}{2\sigma_m^2} \sum_{l=1}^{k} |y_{m(l)}|^2$$

where $k = J_m$, and $2\sigma_m^2$ is a dispersion of a PDF of a BIS αS distribution of the m-th CR.

17. The method of claim 11, wherein generating the SSI comprises generating, with respect to the test statistic $T_{GSO}(y_m, J_m)$, the SSI using a binary SSI value $x_m$ in accordance with the following equation:

$$x_m = \begin{cases} 1, & \text{if } T_{GSO}(\underline{y_m}, J_m) \geq \lambda_m \\ 0, & \text{otherwise} \end{cases}$$

where the threshold $\lambda_m$ is an individual threshold given to the m-th CR.

* * * * *